(12) United States Patent
Cain

(10) Patent No.: US 6,961,310 B2
(45) Date of Patent: Nov. 1, 2005

(54) MULTIPLE PATH REACTIVE ROUTING IN A MOBILE AD HOC NETWORK

(76) Inventor: Joseph Bibb Cain, 200 Melbourne Ave., Indialantic, FL (US) 32903

(*) Notice: Subject to any disclaimer, the term of this patent is extended or adjusted under 35 U.S.C. 154(b) by 409 days.

(21) Appl. No.: 10/214,997

(22) Filed: Aug. 8, 2002

(65) Prior Publication Data

US 2004/0029553 A1 Feb. 12, 2004

(51) Int. Cl.[7] .............................. H04L 1/00; H04Q 7/24
(52) U.S. Cl. ...................... 370/238; 370/252; 370/338; 375/267; 709/240; 709/241
(58) Field of Search .............................. 370/238, 238.1, 370/252, 338, 349, 330, 332, 340, 341; 375/267; 709/239, 240, 241, 242; 455/450, 452, 455

(56) References Cited

U.S. PATENT DOCUMENTS

| | | | |
|---|---|---|---|
| 5,412,654 A | 5/1995 | Perkins | 370/94.1 |
| 5,754,543 A * | 5/1998 | Seid | 370/351 |
| 5,832,197 A * | 11/1998 | Houji | 714/4 |
| 5,974,236 A * | 10/1999 | Sherman | 709/221 |
| 5,987,011 A | 11/1999 | Toh | 370/331 |
| 6,026,073 A * | 2/2000 | Brown et al. | 370/216 |
| 6,111,941 A * | 8/2000 | Schreyer | 379/220.01 |
| 6,304,556 B1 | 10/2001 | Haas | 370/254 |
| 6,349,091 B1 * | 2/2002 | Li | 370/238 |
| 6,385,174 B1 | 5/2002 | Li | 370/252 |
| 2001/0033556 A1 | 10/2001 | Krishnamurthy et al. | 370/329 |
| 2002/0062388 A1 | 5/2002 | Ogier et al. | 709/238 |
| 2002/0071391 A1 * | 6/2002 | Ishioka | 370/238 |
| 2004/0047345 A1 * | 3/2004 | Joseph et al. | 370/352 |

OTHER PUBLICATIONS

Mirhakkak et al., *Dynamic Quality-of-Service for Mobile Ad Hoc Networks*, MITRE Corp., 2000.

Van Dyck et al., *Distributed Sensor Processing Over an Ad-Hoc Wireless Network: Simulation Framework And Performance Criteria*, Proceedings IEEE Milcom, Oct. 2001.

(Continued)

Primary Examiner—Ricky Ngo
Assistant Examiner—Soon D. Hyun
(74) Attorney, Agent, or Firm—Allen, Dyer, Doppelt, Milbrath & Gilchrist, P.A.

(57) ABSTRACT

The method includes routing message data from a source node to a destination node in a mobile ad hoc network. The mobile ad-hoc network includes a plurality of intermediate mobile nodes between the source node and the destination node, and a plurality of wireless communication links connecting the nodes together. The method includes, at the source node, discovering routing to the destination node, ranking discovered routes according to at least one link metric, and distributing the message data to the destination node along a plurality of the discovered routes based upon the ranking. The link metric may include a measurement of link delay, link capacity, link available capacity, and/or link reliability.

36 Claims, 4 Drawing Sheets

OTHER PUBLICATIONS

Zhu, *Medium Access Control and Quality–of–Service for Mobile Ad Hoc Networks*, PHD Thesis, Department of Computer Engineering, University of Maryland, College Park, MD, 2001.

Royer et al., *A Review of Current Routing Protocols for Ad Hoc Mobile Wireless Networks*, IEEE Personal Communications, Apr. 1999, pp. 46–55.

Corson et al., *A Reservation–Based Multicast (RBM) Routing Protocol for Mobile Networks: Initial Route Constructions Phase*, ACM/I. 1, No. 4, 1995, pp. 1–39.

Xiao et al., *A Flexible Quality of Service Model for Mobile Ad Hoc Networks, IEEE VTC2000–spring*, Tokyo, Japan, May 2000.

Wu et al., *QoS Support in Mobile Ad Hoc Networks*, Computing Science Department, University of Alberta, (no date available).

Corson et al., *Mobile Ad Hoc Networking (MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol* (IERP) for Ad Hoc Networks, Internet Engineering Task Force (IETF) MANET Working Group, Internet Draft, Jun. 2001.

Clausen et al. *Optimized Link State Routing Protocol*, Internet Engineering Task Force (IETF) MANET Working Group, Internet Draft, Oct. 31, 2001.

Perkins et al., *Quality of Service in Ad Hoc On–Demand Distance Vector Routing*, Internet Engineering Task Force (IETF) MANET Working Group, Internet Draft, Jul. 2000.

Park et al., *Temporally–Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve–Path Forwarding* (TBRPF), Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Johnson et al., *The Dynamic Source Routing Protocol for Mobile Ad Hoc Networks* (DSR), Internet Engineering Task Force (IETF MANET Working Group, Internet Draft, Nov. 21, 2001.

Perkins et al., *Ad hoc On–Demand Distance Vector (ADOV) Routing*, Internet Engineering Task Force (IETF) MANET Working Group, Internet Draft, Nov. 9, 2001.

Chakrabarti et al., "*QoS Issues in Ad Hoc Wireless Networks*", IEEE Communications Magazine, (2/01),, pp. 142–148.

Chen, "*Routing Support for Providing Guaranteed End-to–End Qualtiy–of–Service*," Ph.D. thesis, Univ. fo Illinois at Urbana–Chanmpaign, http://cairo.cs.uiuc.edu/papers/Scthesis.ps 1999.

* cited by examiner

MULTIPLE PATH REACTIVE ROUTING IN A MOBILE AD HOC NETWORK

FIELD OF THE INVENTION

The present invention relates to the field of communication networks, and, more particularly, to mobile ad hoc wireless networks and related methods.

BACKGROUND OF THE INVENTION

A rapidly developing area of wireless networks is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. The network does not in general depend on a particular node and dynamically adjusts as some nodes join or others leave the network.

An ad hoc network can be quickly deployed and provide much needed communications. Ad hoc networks will allow people to exchange data in the field or in a class room without using any network structure except the one they create by simply turning on their computers or PDAs, for example.

New applications for mobile ad hoc networks will continue to emerge and become an important part of the communication structure. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol needs to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to pro-active protocols which maintain routes to all destinations at all times. It is important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both proactive and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route.

Quality-of-service (QoS) routing in mobile ad hoc networks is gaining interest. To provide quality-of-service, the protocol needs not only to find a route but also to secure the resources along the route. Because of the limited, shared bandwidth of the network, and lack of central controller which can account for and control these limited resources, nodes must negotiate with each other to manage the resources required for QoS routes. This is further complicated by frequent topology changes. Due to these constraints, QoS routing is more demanding than best-effort routing.

Some examples of QoS routing approaches are set forth by Chenxi Zhu in the publication entitled "Medium Access Control and Quality-of-Service Routing for Mobile Ad Hoc Networks," 2001, and by M. Mirhakkak et al. in the publication entitled "Dynamic Quality-of-Service for Mobile Ad Hoc Networks," MITRE Corp., 2000. Zhu discusses establishing bandwidth guaranteed QoS routes in small networks whose topologies change at a low to medium rate. Mirhakkak et al. are concerned with resource reservation requests which specify a range of QoS values while the network makes a commitment to provide service within this range.

The performance and reliability of reactive routing protocols such as DSR and AODV is a concern in the field of mobile ad-hoc networks. Conventional DSR finds multiple paths, but it only uses a single path for the transmission of message data/mission traffic. The remaining paths can be backups, but are often stale when needed. Conventionally, AODV finds a single path. Failure of the primary path often results in significant delay because mission traffic must wait on a new route discovery process to complete.

SUMMARY OF THE INVENTION

In view of the foregoing background, it is therefore an object of the present invention to provide more reliable and more timely routes with less traffic load concentration in a mobile ad hoc network.

This and other objects, features, and advantages in accordance with the present invention are provided by a method for routing message data from a source node to a destination node in a mobile ad hoc network. The mobile ad-hoc network including a plurality of intermediate mobile nodes between the source node and the destination node, and a plurality of wireless communication links connecting the nodes together. The method includes, at the source node, discovering routing to the destination node, ranking discovered routes according to at least one link metric, and distributing the message data to the destination node along a plurality of the discovered routes based upon the ranking. The link metric may include a measurement of link delay, link capacity, link available capacity, and/or link reliability.

Distributing the message data may include distributing duplicate message data along the plurality of discovered routes, and/or distributing different portions of the message data along each of the plurality of discovered routes. Also, ranking the discovered routes preferably includes storing route entries in a route cache with each route entry corresponding to one of the discovered routes. Each route entry may include a metric value, a usage factor indicating how much of the message data should be distributed to the corresponding route, and a timer value for expiring the discovered route. The route entries may be repeated in the route cache for different classes of message data, such as delay sensitive message data and large volume message data.

The method may also include, at the source node, intermediate nodes and/or the destination node, detecting whether the node can continue to support the route request and, if not, generating an error notification for a failed route. Upon receiving the error notification, the source node will purge the failed route from the discovered routes, and preferably distribute message data among remaining discovered routes. Additionally, the source node may transmit a second route request to discover new routing to the destination node when the number of discovered routes falls below a threshold.

Objects, features, and advantages in accordance with the present invention are also provided by a mobile ad hoc network including a plurality of mobile nodes, and a plurality of wireless communication links connecting the plurality of mobile nodes together. Each mobile node comprises a communications device to wirelessly communicate with other nodes of the plurality of nodes via the wireless communication links, and a controller to route communications via the communications device. The controller includes a route discovery unit to discover routing to a destination node, a route ranking unit to rank discovered routes according to at least one link metric, and a message data distribution unit to distribute the message data to the destination node along a plurality of the discovered routes based upon the rank. The link metric is preferably a measurement of link delay, link capacity, link available capacity, and/or link reliability.

The message data distribution unit may distribute duplicate message data along the plurality of discovered routes and/or different portions of the message data along each of the plurality of discovered routes. The route ranking unit comprises a route cache for storing route entries each corresponding to one of the discovered routes. Again, each route entry may include a metric value, a usage factor indicating how much of the message data should be distributed to the corresponding route, and a timer value for expiring the discovered route. Also, the ranking unit may repeat route entries in the route cache for different classes of message data, such as delay sensitive message data and large volume message data.

Also, the controller may include a route request processing unit to determine whether the node can continue to support the route request and, if not, to generate an error notification for a failed route. The route ranking unit purges failed routes from the discovered routes, and the route discovery unit discovers new routing to the destination node when the number of discovered routes falls below a threshold.

DETAILED DESCRIPTION OF THE PREFERRED EMBODIMENTS

Figure 1:
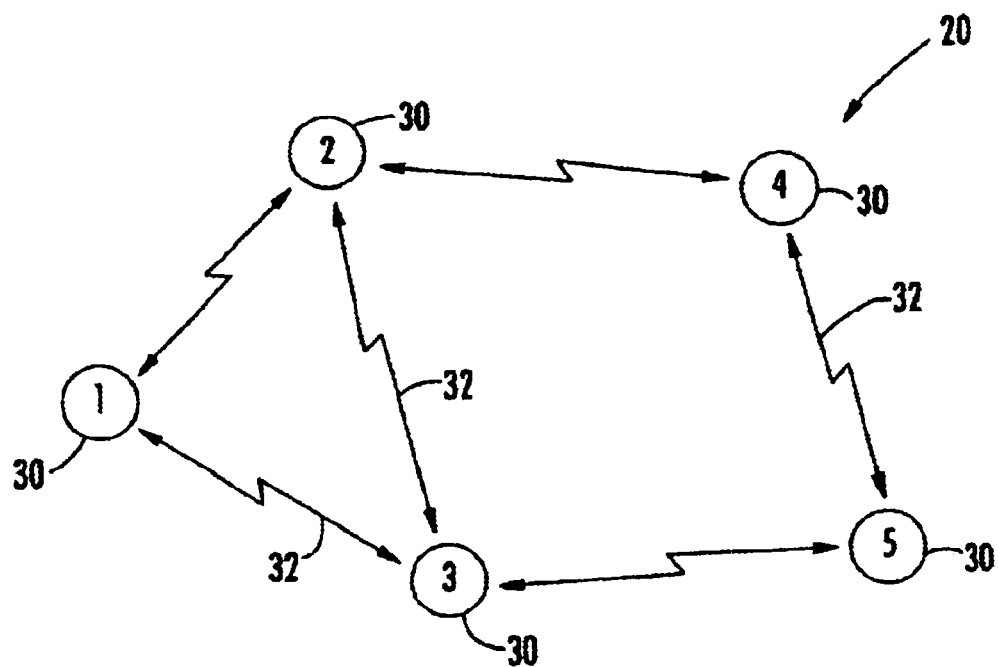
FIGS. 1–4 are schematic diagrams of a mobile ad hoc network including in accordance with the present invention.
Figure 2:
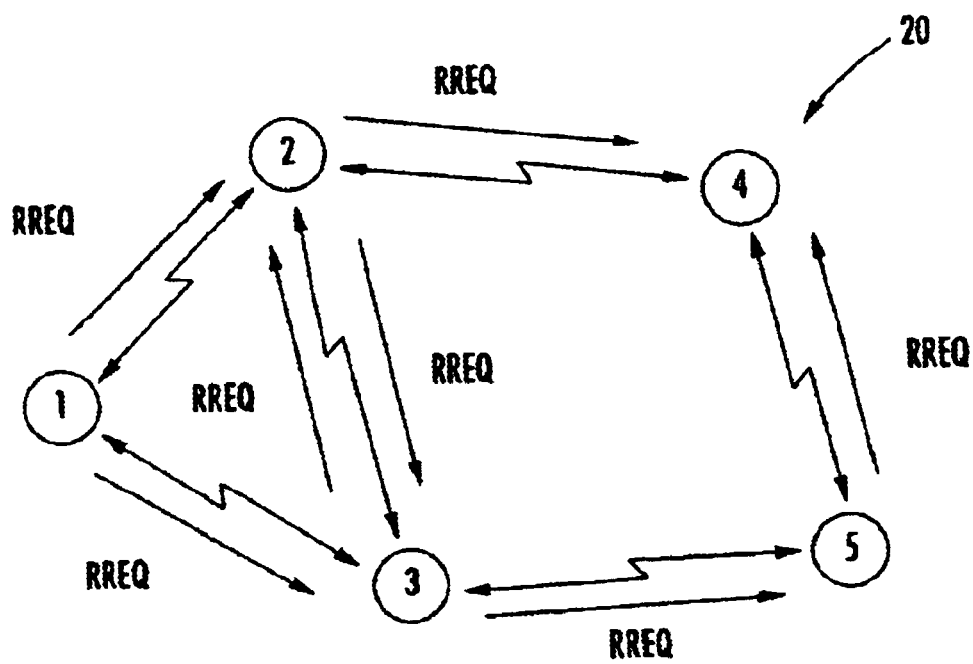
Figure 3:
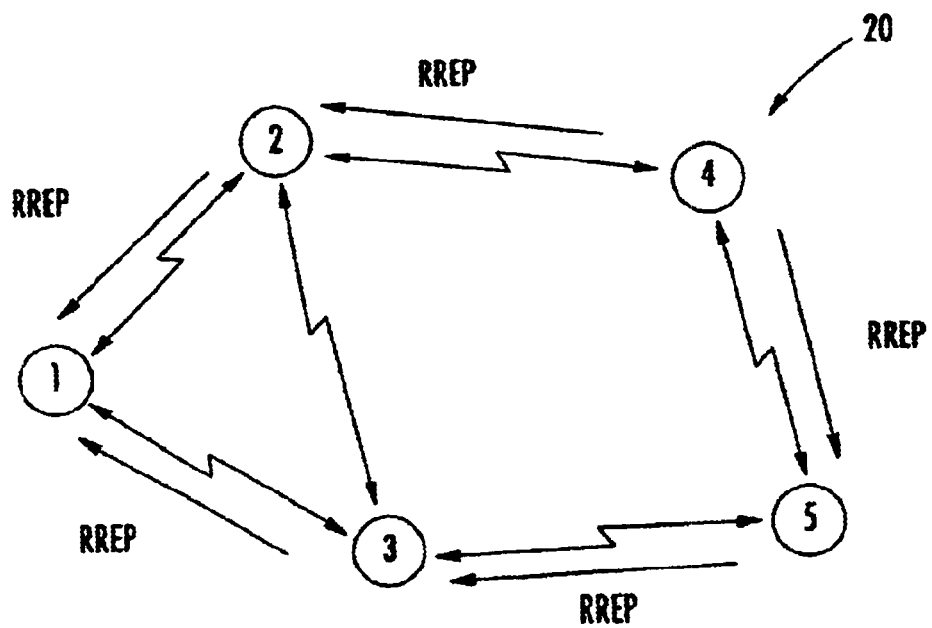
Figure 4:
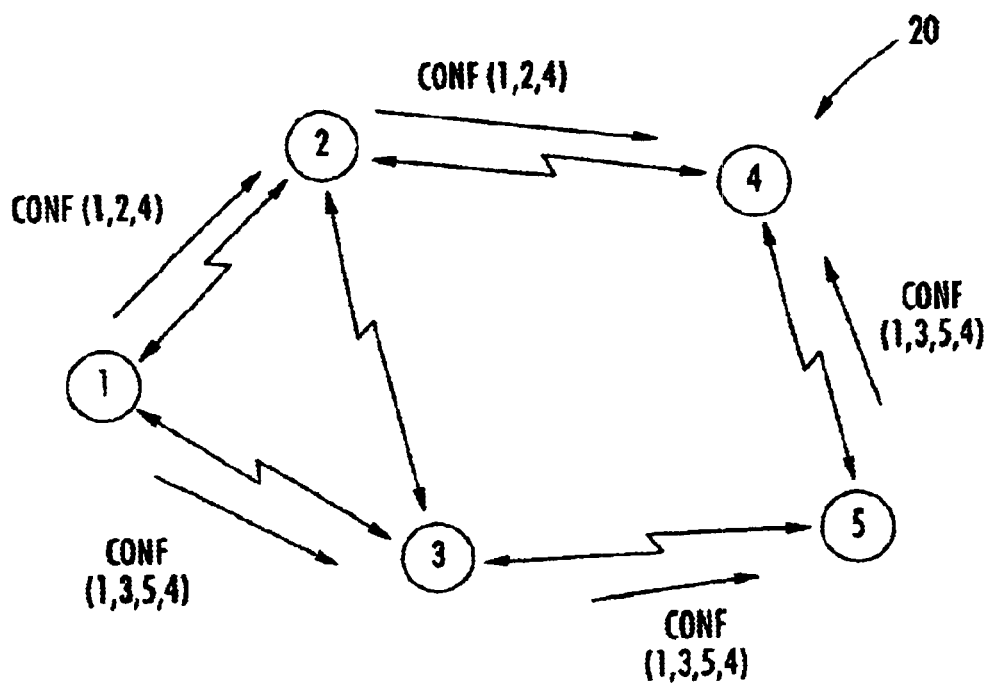
Figure 5:
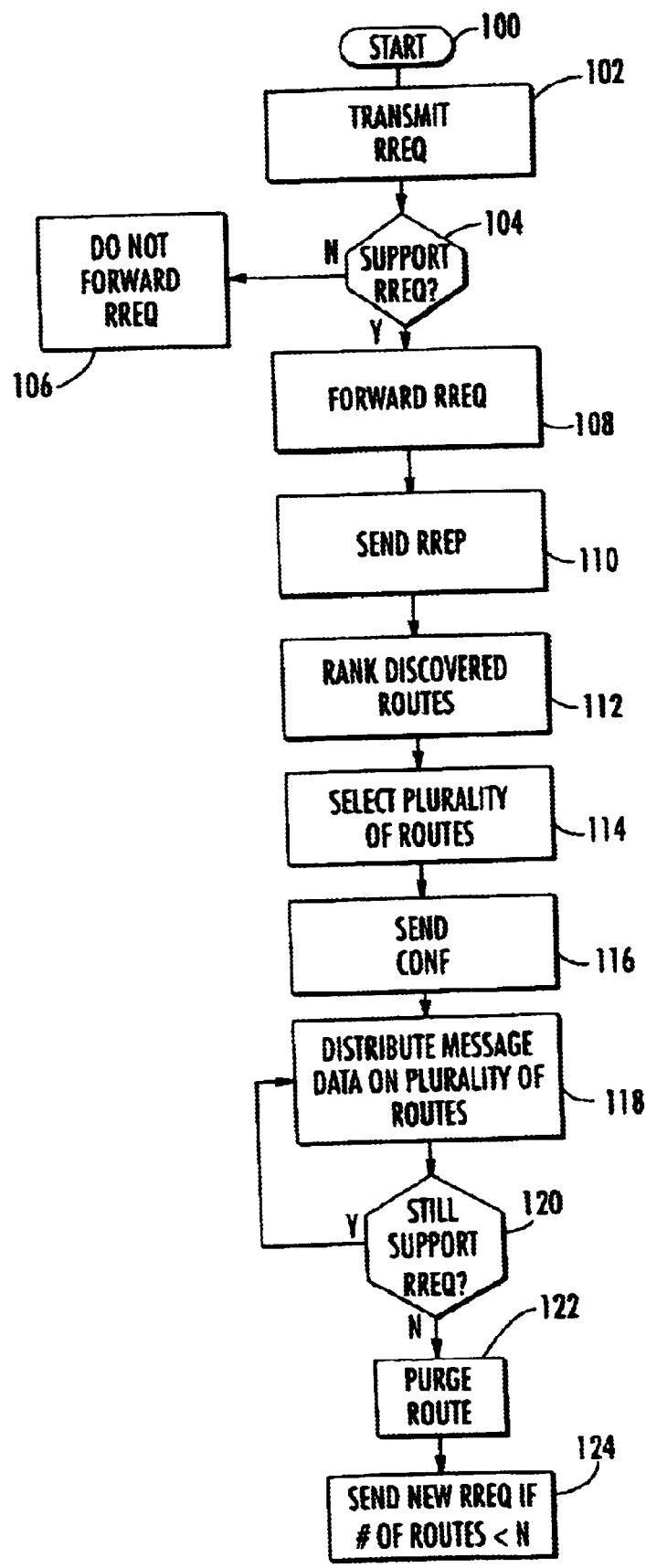
FIG. 5 is a flowchart illustrating the method steps for in a mobile ad hoc network in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring initially to FIGS. 1–5, a method for in a mobile ad hoc network 20 will now be described. The network 20 includes a plurality of mobile nodes 30 including the source node 1 and the destination node 4 with intermediate nodes 2, 3 and 5 therebetween. The nodes 30, such as laptop computers, personal digital assistants (PDAs) or mobile phones, are connected by wireless communication links 32 as would be appreciated by the skilled artisan. The method begins (block 100) and includes transmitting a route request RREQ from the source node 1 to discover routing to the destination node 4, as indicated at block 102 in FIG. 5. More specifically, when a new route is needed to a given destination node 4, the source node 1 broadcasts the RREQ packet to the destination node. This RREQ packet is similar to the conventional RREQ packet used in a protocol such as DSR or AODV, but may include a link/route metric, as will be discussed in more detail below. The conventional RREQ broadcast is used for "best effort" service. The method of the present invention may still follow the conventional procedures established by the protocol for best effort service.

Furthermore, at block 104, the method includes each intermediate node 2, 3 and 5 determining whether the node can support the route request RREQ. If the node cannot support the particular request RREQ, then the request is denied or simply not forwarded by the node (block 106). If the node, for example node 3, can support the particular request RREQ, then the node forwards the route request to other intermediate nodes 2 and 5 (block 108), and may temporarily reserve node resources for that route request. Intermediate nodes 2 and 5 also must determine whether they can support the route request RREQ forwarded from node 3. If so, the route request RREQ is then forwarded to the destination node 4.

The destination node 4, upon receiving the route request RREQ, generates a reply RREP to the source node 1 for each discovered route (block 110). In other words, the destination node 4 may have received the forwarded route request RREQ from any of various possible routes including, for example, 1-2-4 or 1-3-5-4. A reply RREP is generated in each case. At block 112, the source node 1 ranks the discovered routes according to one or more link metrics. The link metric is preferably a measurement of link delay, link capacity, link available capacity, and/or link reliability as will be discussed below.

Ranking the discovered routes preferably includes storing route entries in a route cache or table. Each of the route entries corresponds to one of the discovered routes. Also, each route entry may include a metric value, a usage factor indicating how much of the message data should be distributed to the corresponding route, and a timer for expiring the discovered route. Some or all of the route entries may be repeated for different classes of message data/traffic, such as, delay sensitive traffic and/or large volume traffic, for example.

At block 114, the source node 1 then selects a plurality of routes to the destination node 4, and, at block 116, the source node may transmit route confirmations CONF to intermediate nodes on the selected route. This is to confirm the use of the resources on the selected route in a system using a routing approach other than a best effort approach, such as quality of service routing.

Also, at block 118, the source node 1 distributes the message data to the destination node 4 along the plurality of discovered routes, such as routes 1-2-4 and 1-3-5-4, for example. Distributing the message data may include distributing duplicate message data along the plurality of discovered routes for improved reliability, and/or distributing different portions of the message data along each of the plurality of discovered routes for improved timeliness. As used herein, "message data" is intended to include any data that may be sent between nodes in the mobile ad-hoc network, including (but not limited to) video data, audio data, alphanumeric data, etc., as would be appreciated by the skilled artisan.

At block 120, the intermediate nodes 2, 3 and 5, and/or the destination node 4, may detect at any time whether the node can continue to support the route request RREQ. If the node cannot continue to support the request RREQ, then the node generates an error notification RERR to the source node 1. Here, (block 122) the source node 1 may purge the failed route, upon receiving the error notification RERR, while maintaining the use of the other discovered routes. However, if the number of discovered routes falls below a certain threshold, then the source node 1 may again transmit a route request RREQ to discover new routing to the destination node 4 (block 124).

The described method can be applied to any type of On-Demand or Reactive routing protocol, such as Dynamic Source Routing (DSR) or Ad-Hoc On-Demand Distance Vector (AODV) routing, or to any hybrid proactive/reactive protocol, such as Zone Routing Protocol (ZRP), as would be appreciated by the skilled artisan. The described procedures are easily applied to the DSR protocol. The conventional DSR message types RREQ, RREP, RRER are defined as optional packet types, and can be used as defined for the conventional operation of the protocol to support "best effort" traffic in a backwards compatibility mode. New optional packet types may be defined to support the measurement of certain link metrics. Definition of the required header fields for these types is straightforward based on the functions defined above.

As described, the performance of reactive ad hoc routing protocols such as DSR and AODV are improved to provide more reliable and more timely routes with less traffic load concentration. Routes are discovered via route-request and route-reply scheme. It should be noted that conventional DSR finds multiple paths, but it only uses a single path for message data transmission while remaining paths can be backups, but are often stale when needed. Conventionally, AODV finds a single path. Failure of primary path often results in significant delay because mission traffic must wait on a new route discovery process to complete.

As discussed, the present invention provides the discovery and use of multiple routes with appropriate metrics for each to the destination. Discovered paths are ranked according to metric and/or traffic class. Routing cache/table is tailored to utilize up to n routes simultaneously per destination (may be used either to distribute the load or for reliability). Traffic is distributed across multiple routes according to rank and value indicated by the path metrics. Usage of n paths allows simultaneous maintenance of n paths while failure of a single path can leave n−1 paths still operational.

The route cache/table includes destination indexes into a group of routes (either source routes for DSR or next hop routes for AODV). Each route entry has a metric value, a usage factor (e.g. between 0 and 1) that indicates which fraction of the traffic load should use that route, and a timer for expiring the route. In use, one of up to n routes is selected according to any approach that allows the load to be shared (such as random selection or a round robin servicing according to usage factor). Route entries may also be repeated for each class of traffic (e.g. using different metrics and ranking for each class).

Regarding route failure: Nodes discovering route failure generate route error packets (RERR) and send back to the traffic source. Traffic source purges failed routes from cache/table. Traffic source continues to use the n−1 "good" routes. If other routes are available (with satisfactory metric) then they are added to the table to obtain n routes. Usage factors are recalculated. If a failure causes the number of routes in use to fall below a predefined threshold, a new route discovery is initiated to find additional routes.

Regarding the use of metrics: route requests and route replies are modified to accommodate improved metrics. DSR and AODV currently use only hop count which can still be used if desired. Improved metrics can include a variety of measures such as link delay, link capacity, link available capacity, link reliability. More important metrics may depend on the traffic class such as: Delay sensitive traffic may require routes to be rank-ordered based on the delay metric; Large volume traffic may require routes to be rank-ordered based on the capacity metric.

The usage factor for each route as may be calculated as: UsageFactor($Rte_k$)=F($metric_k$, f(metrics for all paths used)). For large volume traffic, bottleneck capacity may be used as a metric in evaluating routes—i.e., UsageFactor($Rte_k$)= BottleneckCapacity$_k$/(sum over all routes (BottleneckCapacity for each route)).

The invention as specifically applied to DSR will be described. DSR naturally collects multiple routes but only one is used. Loop freedom is maintained with multiple routes because the source route indicates the full path (loops are easily detected). DSR is modified to collect appropriate metrics for each link on the source route. The DSR route cache is modified to reflect the use of multiple routes simultaneously for multiple classes of traffic using the route usage factors. Ranking of routes for each traffic class is implemented in the route cache and the top n routes for each traffic class are selected. Because source routes have been collected, the ranking process may include a factor such as disjointness of paths when determining which n paths are the most desirable (disjoint paths would provide a set of paths that are less likely to be simultaneously disrupted due to link/node failures and mobility). Usage factors for top n routes for each traffic class would be calculated based upon the appropriate path metrics as indicated above. Traffic distribution among several paths is done only at the source node. A timer to expire stale routing cache entries may be used (i.e. optional). A higher reliability traffic class which sends duplicate traffic over multiple routes for higher reliability may be implemented. Route failure recovery is implemented as discussed previously. This will naturally discover any stale routes in the top n routes that are being actively used.

The invention as specifically applied to AODV will be described. AODV collects only a single route as currently defined with path hop count as the metric. Thus, AODV should be modified to collect multiple routes with the appropriate metrics. Care should be taken with AODV to insure loop-free routes since it builds next hop routing tables. For example, the following conservative approach will work: Modify AODV route table to reflect the use of multiple routes, the ranking of the top n routes, and the usage factors for top n routes based upon the appropriate path metrics; select one of the top n routes the "best route"—to maintain loop-freedom it will be selected in AODV as the freshest minimum hop count route (the lesser routes included in the top n can have up to 1 greater hop count); Intermediate nodes return RREPs designating only their choice for "best route" while the destination can return multiple RREPs for paths through different neighbors; Selection of one of n possible paths occurs only at the source node—each intermediate forwarding node always forwards a packet along its "best route". When a node finds a route that is fresher than another route already in use it does not have to discard the other route unless it fails or hop count is too high. Higher reliability traffic class which sends duplicate traffic over multiple routes for higher reliability may be implemented. Route failure results in generation of RERRs and triggering the failure recovery process as indicted above.

Thus, as described, the present invention supports conventional ad hoc routing protocols such as DSR and AODV but significantly improves performance. Multiple routes can be used either for load balancing or increased probability of data traffic delivery. The use of multiple routes can provide more timely backup routes when path failures occur. In most cases failures will not disrupt data traffic other than the traffic temporarily lost on the failed link. Route discovery can be initiated before all routes have failed reducing the likelihood of having no routes, i.e. route discovery that is initiated after all routes are lost will be much rarer.

Figure 6:
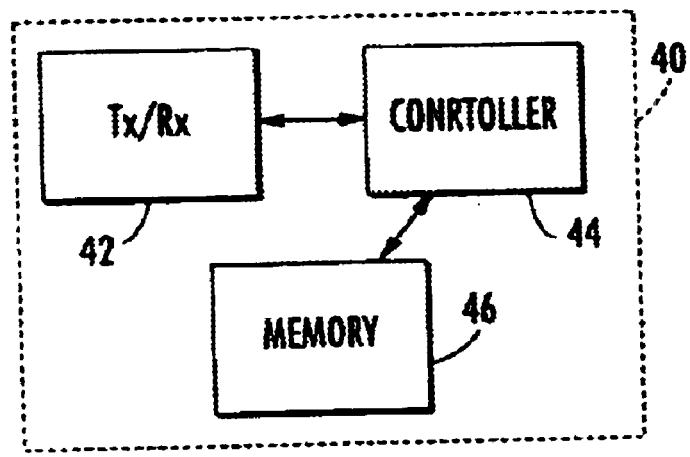
FIG. 6 is a schematic diagram illustrating a router of a node in accordance with the network of the present invention.
Figure 7:
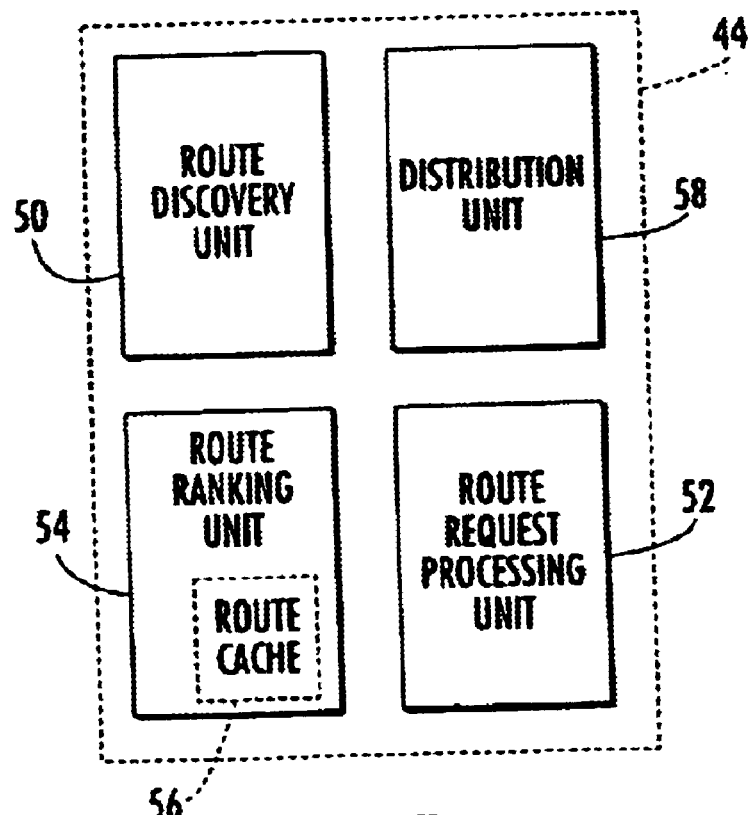
FIG. 7 is a schematic diagram illustrating the details of the controller of the router in FIG. 6.

Referring now additionally to FIGS. 6 and 7, a system aspect of the invention will be described. A mobile ad hoc network 20 includes a plurality of mobile nodes 30, and a plurality of wireless communication links 32 connecting the plurality of mobile nodes together. Each mobile node includes a router 40 (FIG. 6) that has a communications device 42 to wirelessly and uni-directionally or bi-directionally communicate with other nodes via the wireless communication links 32, and a controller 44 to route communications via the communications device 42. Also, a memory 46 may be included as part of the controller 44 or in connection with the controller.

As shown in FIG. 7, the controller 44 includes a route discovery unit 50 to transmit the route requests to other nodes to discover routing to a destination node. Also, a route request processing unit 52 determines whether the node can support a route request. Furthermore, the route request processing unit 52 detects whether the node can continue to support the route request and, if not, generates the error notification RERR. A route ranking unit 54 ranks discovered routes according to one or more link metrics, and a message data distribution unit 58 distributes the message data to the destination node along a plurality of the discovered routes based upon the rank. Again, the link metric is preferably a measurement of link delay, link capacity, link available capacity, and/or link reliability.

The message data distribution unit 58 may distribute duplicate message data along the plurality of discovered routes and/or different portions of the message data along each of the plurality of discovered routes. The route ranking unit 54 comprises a route cache 56 for storing route entries each corresponding to one of the discovered routes. Again, each route entry may include a metric value, a usage factor indicating how much of the message data should be distributed to the corresponding route, and a timer for expiring the discovered route. Also, the ranking unit 54 may repeat route entries in the route cache for different classes of message data, such as delay sensitive message data and large volume message data. The route ranking unit 54 purges failed routes from the discovered routes, and the route discovery unit 50 discovers new routing to the destination node when the number of discovered routes falls below a threshold.

Many modifications and other embodiments of the invention will come to the mind of one skilled in the art having That which is claimed is:

1. A method for routing message data from a source node to a destination node in a mobile ad hoc network comprising a plurality of intermediate mobile nodes between the source node and the destination node, and a plurality of wireless communication links connecting the nodes together, the method comprising:
   at the source node, transmitting a route request to discover routing to the destination node;
   at each intermediate node, determining whether the intermediate node can support the route request and, if so, forwarding the route request to one of other intermediate nodes and the destination node, and temporarily reserving node resources for supportable route requests;
   at the destination node, upon receiving the route request, generating a reply to the source node for each discovered route;
   at the source node, ranking the discovered routes according to at least one link metric;
   at the source node, selecting a plurality of routes to the destination node based upon the ranking;
   at the source node, transmitting route confirmations to intermediate nodes on the plurality of selected routes; and
   at the source node, distributing the message data to the destination node along the plurality of discovered routes.

2. A method according to claim 1 wherein distributing the message data comprises distributing duplicate message data along the plurality of discovered routes.

3. A method according to claim 1 wherein distributing the message data comprises distributing different portions of the message data along each of the plurality of discovered routes.

4. A method according to claim 1 wherein ranking the discovered routes comprises storing route entries in a route cache, each route entry corresponding to one of the discovered routes.

5. A method according to claim 4 wherein each route entry includes:
   a metric value for the link metric; and
   a usage factor indicating how much of the message data should be distributed to the corresponding route.

6. A method according to claim 5 wherein each route entry further includes a timer value for expiring the discovered route.

7. A method according to claim 4 wherein storing route entries comprises repeating route entries in the route cache for different classes of message data.

8. A method according to claim 7 wherein the different classes of message data include delay sensitive message data and large volume message data.

9. A method according to claim 1 wherein the link metric comprises a measurement of at least one of link delay, link capacity, link available capacity, and link reliability.

10. A method according to claim 1 further comprising, at the intermediate nodes and the destination node, detecting whether the node can continue to support the route request and, if not, generating an error notification to the source node for a failed route.

11. A method according to claim 10 further comprising, at the source node, upon receiving the error notification, purging the failed route from the discovered routes.

12. A method according to claim 11, further comprising, at the source node, transmitting a second route request to discover new routing to the destination node when the number of discovered routes falls below a threshold.

13. A method for routing message data from a source node to a destination node in a mobile ad hoc network comprising a plurality of intermediate mobile nodes between the source node and the destination node, and a plurality of wireless communication links connecting the nodes together, the method comprising:
   at the source node, discovering routing to the destination node;
   at the source node, ranking discovered routes according to at least one link metric; and
   at the source node, simultaneously distributing the message data to the destination node along a plurality of the discovered routes based upon the ranking.

14. A method according to claim 13 wherein distributing the message data comprises distributing duplicate message data along the plurality of discovered routes.

15. A method according to claim 13 wherein distributing the message data comprises distributing different portions of the message data along each of the plurality of discovered routes.

16. A method according to claim 13 wherein ranking the discovered routes comprises storing route entries in a route cache, each route entry corresponding to one of the discovered routes.

17. A method according to claim 16 wherein each route entry includes:
   a metric value for the link metric; and
   a usage factor indicating how much of the message data should be distributed to the corresponding route.

18. A method according to claim 17 wherein each route entry further includes a timer value for expiring the discovered route.

19. A method according to claim 16 wherein storing route entries comprises repeating route entries in the route cache for different classes of message data.

20. A method according to claim 19 wherein the different classes of message data include delay sensitive message data and large volume message data.

21. A method according to claim 13 wherein the link metric comprises a measurement of at least one of link delay, link capacity, link available capacity, and link reliability.

22. A method according to claim 13 further comprising, at the source node, detecting failed routes and purging failed routes from the discovered routes.

23. A method according to claim 22 further comprising, at the source node, distributing the message data to the destination node along remaining discovered routes.

24. A method according to claim 23, further comprising, at the source node, transmitting a second route request to discover new routing to the destination node when the number of discovered routes falls below a threshold.

25. A mobile ad hoc network comprising:
   a plurality of mobile nodes; and
   a plurality of wireless communication links connecting the plurality of mobile nodes together;
   each mobile node comprising
      a communications device to wirelessly communicate with other nodes of the plurality of nodes via the wireless communication links, and a controller to route communications via the communications device, the controller comprising
- a route discovery unit to discover routing to a destination node,
- a route ranking unit to rank discovered routes according to at least one link metric, and
- a message data distribution unit to simultaneously distribute the message data to the destination node along a plurality of the discovered routes based upon the rank.

26. A network according to claim 25 wherein the message data distribution unit distributes duplicate message data along the plurality of discovered routes.

27. A network according to claim 25 wherein the message data distribution unit distributes different portions of the message data along each of the plurality of discovered routes.

28. A network according to claim 25 wherein the route ranking unit comprises a route cache for storing route entries each corresponding to one of the discovered routes.

29. A network according to claim 28 wherein each route entry includes:
- a metric value for the link metric; and
- a usage factor indicating how much of the message data should be distributed to the corresponding route.

30. A network according to claim 29 wherein each route entry further includes a timer value for expiring the discovered route.

31. A network according to claim 28 wherein the ranking unit repeats route entries in the route cache for different classes of message data.

32. A network according to claim 31 wherein the different classes of message data include delay sensitive message data and large volume message data.

33. A network according to claim 25 wherein the link metric comprises a measurement of at least one of link delay, link capacity, link available capacity, and link reliability.

34. A network according to claim 25 wherein the controller further comprises a route request processing unit to determine whether the node can continue to support the route request and, if not, to generate an error notification for a failed route.

35. A network according to claim 34, wherein the route ranking unit purges failed routes from the discovered routes.

36. A network according to claim 35, wherein the route discovery unit discovers new routing to the destination node when the number of discovered routes falls below a threshold.

* * * * *